(12) United States Patent
Maeda

(10) Patent No.: US 7,528,502 B2
(45) Date of Patent: May 5, 2009

(54) SYSTEM AND METHOD FOR EFFICIENT POWER UTILIZATION AND EXTENSION OF BATTERY LIFE

(76) Inventor: Ryuji Maeda, 820 W. "G" St., San Diego, CA (US) 92101

( * ) Notice: Subject to any disclaimer, the term of this patent is extended or adjusted under 35 U.S.C. 154(b) by 0 days.

(21) Appl. No.: 11/262,616

(22) Filed: Oct. 31, 2005

(65) Prior Publication Data

US 2007/0096564 A1    May 3, 2007

(51) Int. Cl.
*H02J 1/12* (2006.01)
(52) U.S. Cl. ........................................ 307/46
(58) Field of Classification Search ............... 307/46
See application file for complete search history.

(56) References Cited

U.S. PATENT DOCUMENTS 3,540,940 A * 11/1970 Hodgson .................. 136/208
6,329,726 B1 * 12/2001 Lau et al. ................... 307/58
2005/0012395 A1 * 1/2005 Eckroad et al. .............. 307/44
2005/0116544 A1 * 6/2005 Hamel et al. ................ 307/46
2005/0194034 A1 * 9/2005 Yamaguchi et al. ......... 136/205

* cited by examiner

*Primary Examiner*—Stephen W Jackson
*Assistant Examiner*—Hal I Kaplan
(74) *Attorney, Agent, or Firm*—John Carr

(57) ABSTRACT

A circuit which extends the operational life of a main energy source coupled to a load, said circuit comprising a power generator having a heat source and a cooler thermally coupled to a thermoelectric generator (TEG) for converting thermal energy into electrical energy; and a first capacitor coupled to the TEG for receiving and storing the electrical energy from the TEG. The circuit further comprising at least one switching element coupled between the first capacitor and the load, a converter coupled between the capacitor and the at least one switching element for generating a regulated output, and a controller for activating the at least one switching element when the charge stored on the first capacitor reaches a predetermined level, thereby delivering power from the first capacitor to the load, via the converter, and reducing the amount of power drawn from the main energy source, thereby extending the operational life of the main energy source.

20 Claims, 7 Drawing Sheets

SYSTEM AND METHOD FOR EFFICIENT POWER UTILIZATION AND EXTENSION OF BATTERY LIFE

FIELD OF THE INVENTION

The invention generally relates to power systems and means for providing power to various electronic systems or devices. More particularly, the invention relates to an energy source, such as a battery, fuel cell, generator, and/or hybrid power supply, and a system and circuit for providing power to an electronic system or device which extends the operational life of the energy source, thereby allowing the energy source to provide power to the electronic system or device for an extended period of time.

BACKGROUND OF THE INVENTION

Electronic systems, devices and applications are continually developing. From cellular phones, portable computers, and compact fuel-cell based generators, to electrical vehicles, the list of electronic systems, devices and applications seems endless. As the number of systems and devices continues to increase, and the applications in which they are used continue to grow, the demand for efficient energy/power supplies that are able to power these systems and devices over extended periods of time has also increased. More specifically, as high performance electronic systems and devices with high power consumption are introduced rapidly to the market place and/or as natural resource scarcity gradually intensifies and the cost of energy consequently increases, the ability to efficiently provide and utilize power is ever increasing.

FIG. 1 illustrates a conventional drive system 113 for providing power to drive a load. The load may be any type of known electronic system or device such as a graphics display, a microprocessor, a memory, a conventional laptop computer or an electric motor. The drive system includes an energy or power source 109 (such as a battery, a fuel cell, a solar cell, etc.) for driving the load 112. The system further includes a regulator/converter 108, and may further include current control elements 110 and 115, which may also be omitted. Here it is noted that 108 may be a regulator and/or a converter, and each may be used interchangeably as they are equivalent in the context of this document. A regulator maintains its output constant within a specified range regardless of changes to its output loading condition, shifts in environment condition (such as temperature, humidity, etc.), or/and variations in its input level. A converter is a known electrical element that takes an input parameter, such as a voltage and produces a prescribed output parameter(s), such as a desired voltage at the output. For example, in a case where the desired conversion is from a low input voltage to a higher output voltage, a step up (boost) voltage converter can be used to achieve the desired output voltage. Alternatively, in the case where the desired conversion is from a high input voltage to a lower output voltage, a step down (buck) voltage converter can be used to achieve the desired output voltage.

Current control elements 110 and 115 are optional elements and are preferably set to control the amount of current provided to the load 112. Examples of elements that can be used as a current control element are a diode, field-effect transistors (MOS FET, JFET, etc.), a bipolar transistor, an insulated gate bipolar transistor, a silicon controlled rectifier, and/or a relay switch. One or more of these elements can be connected in series and/or parallel to act as a current control element and placed in any electrical path(s) within the system.

One problem with this system is that as the load increases in complexity and functionality, the amount of power required for driving the load increases. While conventional power/energy supplies, such as disposable and/or rechargeable batteries are always improving in order to extend the length of the battery life, recent advances in high capacity batteries has not resulted in considerably longer battery life because the increase in power consumption of these electronic systems and devices more than offsets the improvement in battery life.

U.S. Pat. No. 6,570,632 issued to Estes, et al. (hereinafter referred to as "the Estes Patent") proposes one solution for extending the life of a rechargeable battery used to charge/power a portable system—such as a cellular phone. The Estes Patent teaches using heat generated by at least one electrical component which is resident on a printed circuit board (PCB) within the system, and converting this heat into electrical energy. The Estes Patent further teaches using this electrical energy to directly recharge the main power source—a rechargeable battery.

There are several disadvantages to the solution proposed by the Estes Patent. First, the Estes Patent uses the electrical energy to directly recharge a main energy/power source—the rechargeable battery—such as a lithium-ion battery—which can only be accomplished through carefully controlling a complex electrochemical process. Thus, the Estes Patent requires that the main power source be a rechargeable battery and further requires complex battery charging, conditioning and maintenance system circuitry, which must be built into the system. Second, using the electrical energy to recharge the main power source can be inefficient in situations where the system is in use and the main power source must continue to provide energy/power to the load. Accordingly, recharging of the battery would likely occur optimally at a time when the system is not in use and is not taxing or drawing charge from the battery; however, at such time the electrical device(s) in the system is not likely to generate much heat. Therefore, the Estes Patent does not make optimal use of the heat generated by the system when it is active. Finally, rechargeable batteries lose their charging/storage efficiency over time as they are repeatedly charged-discharged and/or continually used. Accordingly, in the solution proposed by the Estes Patent, the efficiency and longevity of the life of the main power source—the rechargeable battery—may actually be decreased and system may become less efficient if the system is continually attempting to recharge the battery whenever it is turned on.

Therefore, there exist needs in the art for a system and method that extends the life of a main power source and provides for more efficient power use without requiring significant additional complex circuitry. There further exists a need for such a system to be able to be implemented in situations where the main power source may not be a rechargeable battery. There further exists a need for such a system where heat generated by the system may be efficiently converted into electrical energy at optimal times and stored for future use, thereby improving the efficiency of such a system.

SUMMARY OF THE INVENTION

The invention consists of a power generating circuit which is coupled in parallel with a main energy/power source to a load. Instead of recharging the main energy/power source, the power generating circuit will provide power directly to the load, thereby reducing the amount of power drawn from the main energy/power source without requiring complex circuitry. Preferably, the power generating circuit includes a heat source, a cooling element, a thermoelectric generator (TEG) for converting thermal energy into electrical energy, a capacitor, at least one switching element, and a monitor/controller for monitoring the electronic system and controlling operation of the power generator circuit.

Described briefly in words, an electrical load is coupled to a main energy/power source and the object of the invention is to extend the life of this main energy/power source and reduce the amount of power drawn from the main energy/power source. Utilizing a second energy/power source whose energy is obtained by converting heat into electrical power (along with a capacitor, several switching elements, and a monitor/controller), energy/power drawn from the main energy/power source is reduced, thereby extending the operational life of the main energy/power source. In order to accomplish this objective, heat (which would be otherwise wasted) is converted into electrical energy or power by using a thermoelectric generator (TEG) and this electrical energy or power is then stored in a capacitor. The converted and stored energy or power is then used to supply power directly to an electrical load, thereby reducing power drawn from the main energy/power source. In a preferred embodiment, the heat can be produced by the main energy/power source, the electrical load itself, or any other internal or external (to the circuit or system in which the present invention is utilized) element that can produce heat.

DETAILED DESCRIPTION OF PREFERRED EMBODIMENTS

The present invention improves power efficiency and can extend the operating life of a main energy/power source, such as a disposable battery, a rechargeable battery, a fuel cell, a power generator, a reactor, and/or any combination of these, i.e., hybrid power source(s), used to provide power to an electrical system or application. The main energy/power source can be either internal or external to the electrical system and may also be any form of power supply, such as power from an electrical outlet connected to a power grid.

In a preferred embodiment of the present invention the power efficiency of electrical systems is improved by reducing the power drawn from the main energy/power source as described in the following sections. It is also possible to supply extra power to an electrical load(s) with the embodiments of the claimed subject matter described herein.

Furthermore, it is possible to increase the operational life ("battery life") and the power efficiency of electrical systems by combining techniques/methods known in the art with the embodiments described herein. Examples known in the art include powering down the un-utilized portion of an electrical system, reducing the power consumption of system portions(s) under lenient conditions, and/or reducing the clock frequency of a digital circuitry when high processing performance is not required.

Figure 1:
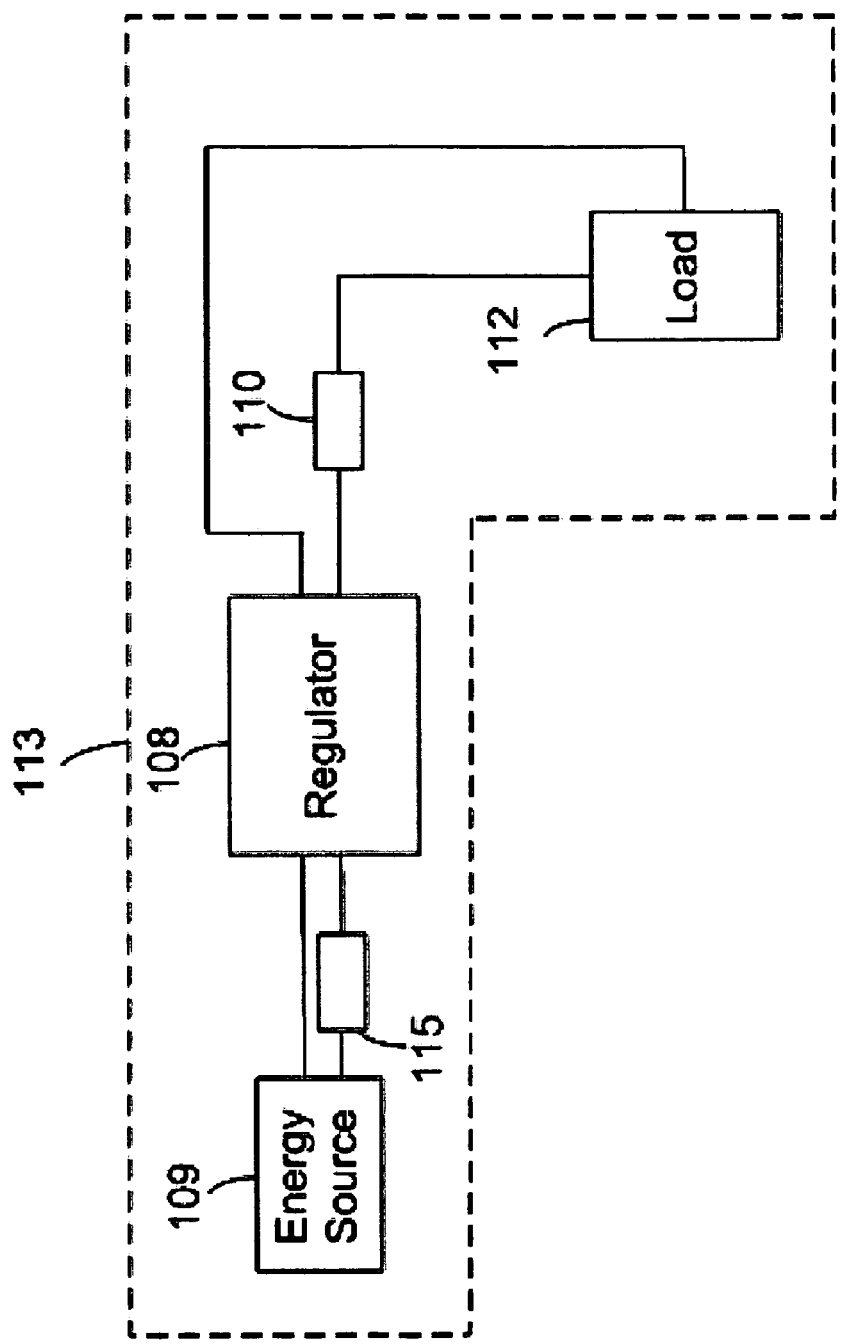
FIG. 1 illustrates a conventional drive system for providing power to drive a load.
Figure 2A:
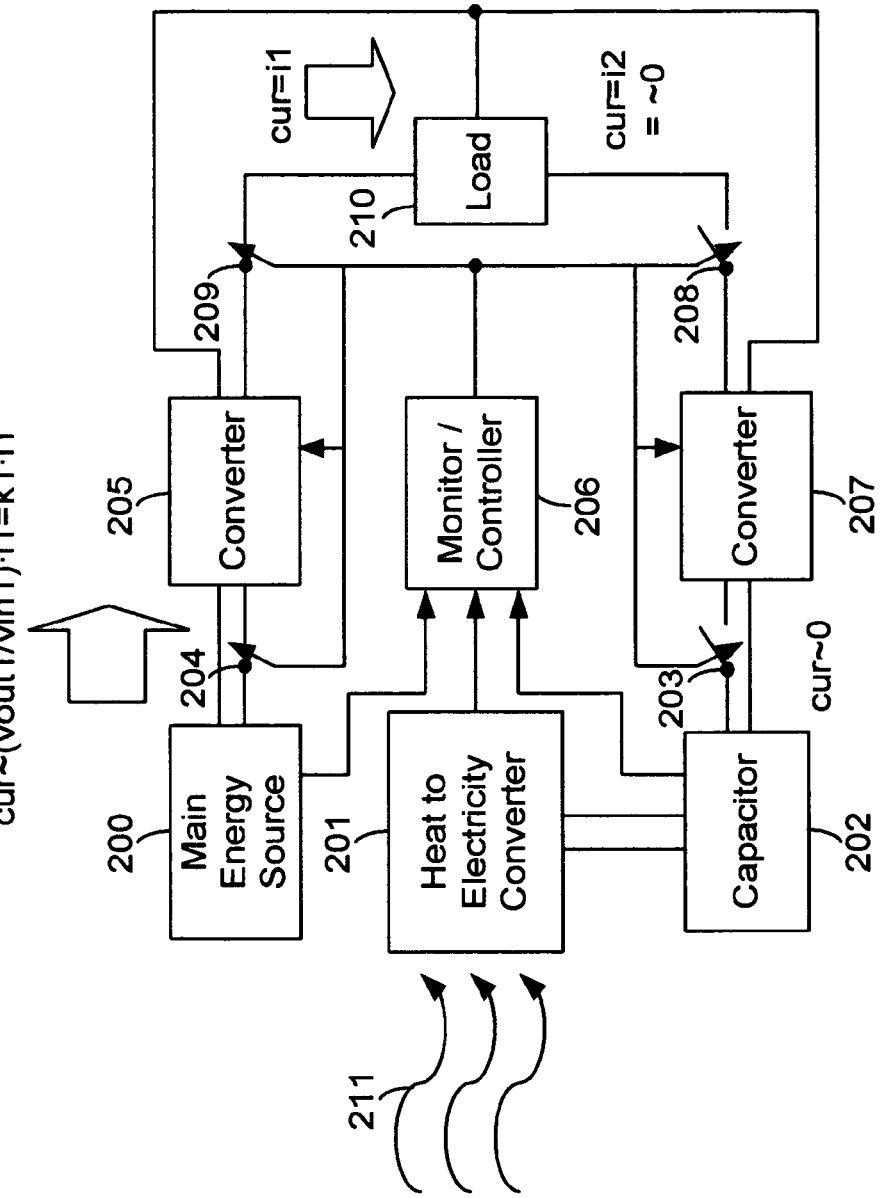
FIGS. 2a-b each illustrate block diagrams which demonstrate the power saving process embodied in the present invention.
Figure 2B:
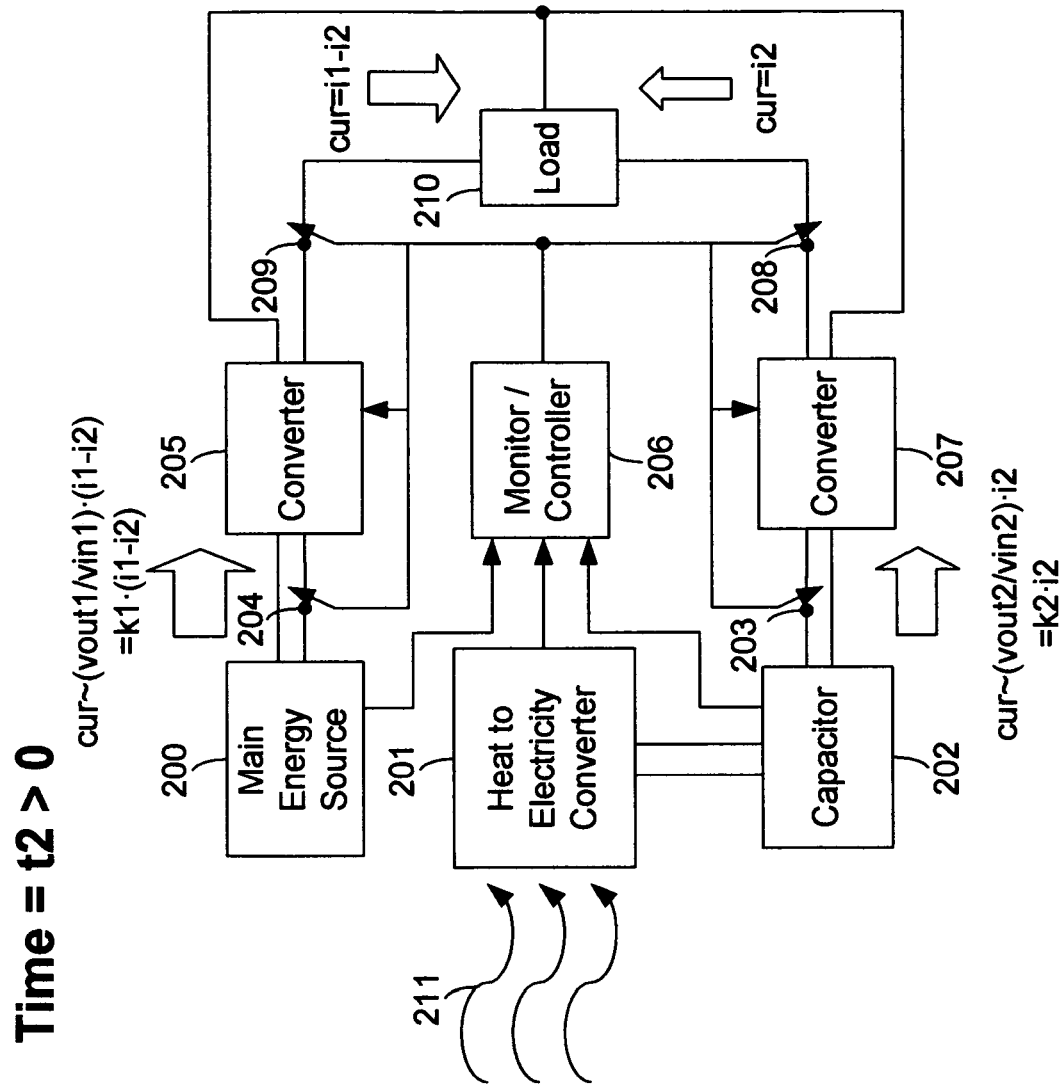

FIGS. 2a-b each illustrate block diagrams which demonstrate the power saving process embodied in the present invention. As shown in both figures, an electrical load 210 is coupled to a main energy/power source 200 via converter 205, and the object of the invention is to extend the life of this main energy/power source 200 by reducing the amount of power/energy drawn from the main energy/power source 200. In order to accomplish this objective, heat 211 (which would be otherwise wasted) is converted into an electrical charge by using a heat to electricity converter (which includes a thermoelectric generator (TEG), a cooling element, and several interface elements). The electrical charge is then stored in a capacitor 202. The converted and stored charge is then used to supply energy/power to the electrical load 210, thereby reducing power drawn from the main energy/power source 200. In a preferred embodiment, the heat 211 can be produced by the main power source 200, the electrical load itself 210, or any other internal or external (to the circuit or system in which the present invention is utilized) element that can produce heat.

Because energy is the time integral of power, a considerably large energy can be developed and stored on the capacitor 202 if enough time is allowed to lapse and the capacitor 202 has high energy storage capability. The capacitor 202 can be any of those currently known and available, such as a supercapacitor or supercap. For the capacitor 202, it is understood that any various combinations of parallel and/or series electrical connections are possible using a plurality of capacitors.

When the power/current from the capacitor 202 is supplied to the electrical load 210, the power/current originated and drawn from the main energy/power source 200 is reduced, thereby extending the life of the main energy/power source 200 and reducing the amount of charge or power drawn from the main energy/power 200 source over time.

Referring to FIG. 2a, when the main energy/power source 200 and the converter 205 are first activated, they work together in order to deliver current or power to the electrical load 210 at time t1 (set arbitrary to 0 as a starting point). At this point in time, the current flowing into the electrical load 210 is i1 (with switching element 204, 209 set to conduct a current.) and the current from converter 207, i2 is zero or approximately zero (i.e., no power saving) because not enough energy/charge has not been accumulated in the capacitor 202. In this particular embodiment, monitor/controller 206 monitors the parameter(s)/state(s) of the main energy/power source 200, heat to electricity converter 201, and capacitor 202. The monitor/controller 206 controls the switching elements 203, 204, 208, 209 and converters 205, 207 based on the parameter(s) or state(s) measured or estimated and by generating and sending out control signals at appropriate times.

Referring now to FIG. 2b, as time progresses the heat to electricity converter 201 starts to generate a potential difference, which is converted to an electrical charge stored on the capacitor 202. When a predetermined high voltage (or charge) is developed on the capacitor 202 at time t2, the monitor/controller 206 turns on the switching element 203, 208 and the converter 207 (in an appropriate order) so that current i2 with non-zero value flows to the electrical load 210. As current i2 flows to the electrical load, the current drawn from the main power source decreases to i1-i2 times the proportionality factor determined by the conversion ratio of the converter 205, which is indicated as k1 in FIG. 2b. As the charge in the capacitor 202 depletes and the voltage (or charge) at the capacitor 202 drops below a predetermined low threshold, the monitor/controller 206 then shuts off the switching element 203, 208 and/or the converter 207 and the process of charging-discharging repeats.

Figure 3:
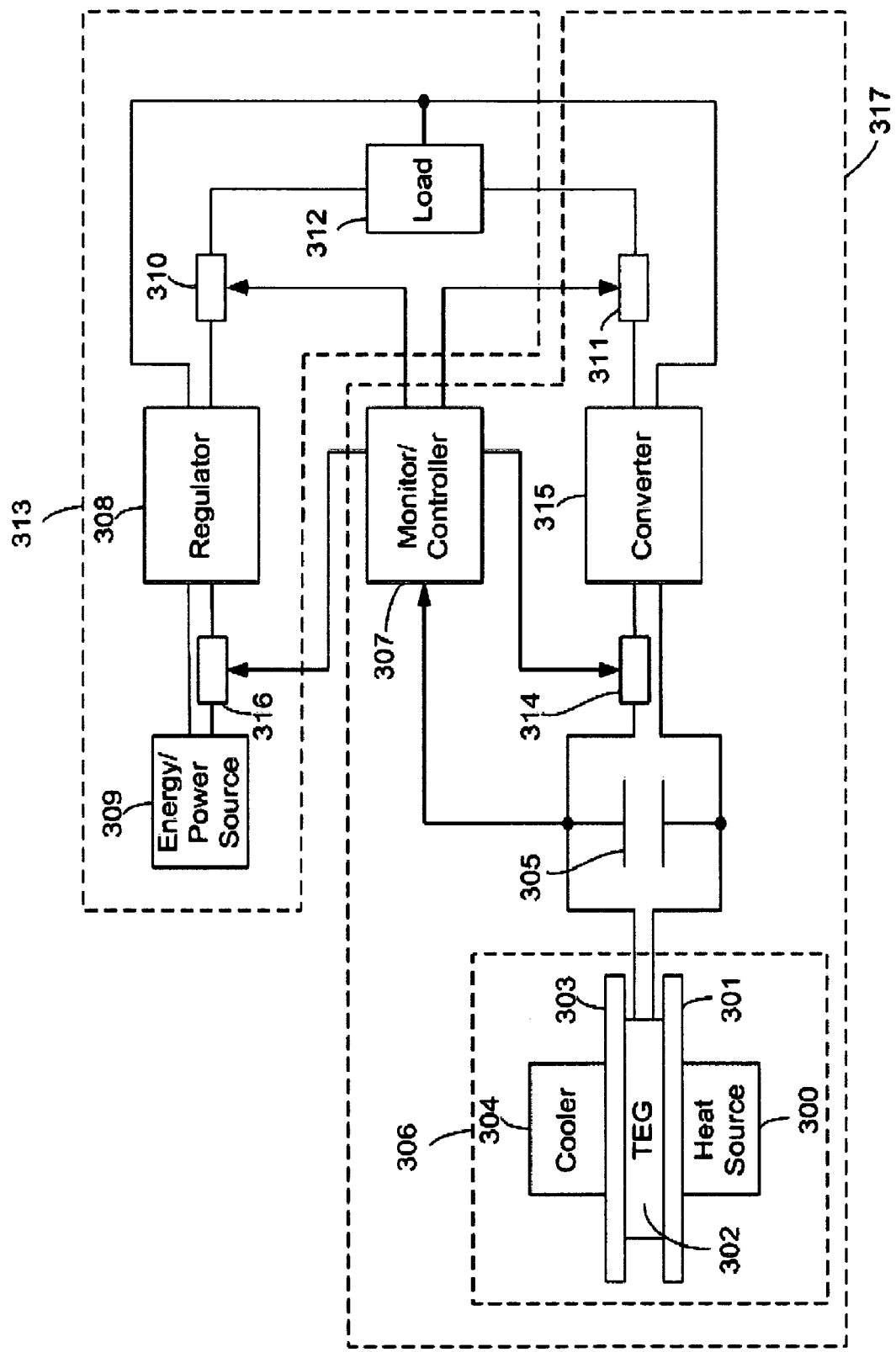
FIG. 3 illustrates an entire drive system which includes a power saving circuit for providing power to an electronic system or device which extends the life of a main energy/power source, in accordance with a preferred-embodiment of the present invention.

FIG. 3 illustrates a system and circuit for providing power to an electronic system or device which extends the life of a main energy/power supply, in accordance with a preferred embodiment of the present invention, thereby allowing the main energy/power supply to provide power to an electronic system or device (hereinafter referred to as "the load") for an extended period of time. As shown in FIG. 3, the main system and circuit consists of a main energy/power source 309 (such as a disposable or rechargeable battery, a fuel cell, a hybrid cell, a solar cell, etc.) for driving a load 312, which may be any known electronic device or system (such a microprocessor, memory, a laptop computer, a graphics display or an electric motor).

The main system and circuit further includes a regulator/converter 308, and current control elements 310 and 316. Here it is noted that the element 308 may be a regulator and/or a converter, and each may be used interchangeably as they are equivalent in the context of this document. A regulator maintains its output constant within a specified range regardless of changes to its output loading condition, shifts in environment condition (such as temperature, humidity, etc.), and/or variations at its input.

Current control elements 310 and 316 are used to control the amount of current provided to the load 312. Examples of elements that can be used as a current control element are a diode, field-effect transistors (MOS FET, JFET, etc.), a bipolar transistor, an insulated gate bipolar transistor, a silicon controlled rectifier, and/or a relay switch. One of more of these elements can be connected in series and/or parallel to act as a current control element and placed in any electrical path(s) within a system.

As shown in FIG. 3, the system and circuit further includes a power generating circuit 317 having a power generating means 306 consisting of a heat source 300, a thermoelectric generator (TEG) 302, a cooler 304, a heat source to TEG interface element 301, and a TEG to cooler interface element 303. The heat source 300 can be the main energy/power source 309, or heat generated by the electrical load 312 itself, or any other elements that produce heat. Preferably, thermoelectric generator (TEG) 302 is an element that produces a potential difference (voltage) when a temperature difference exists between its "hot" and "cold" sides of the element. Presently, the majority of thermoelectric generators used for room temperature range utilize Bi—Te compounds semiconductor materials. The embodiments described herein do not preclude the use of TEG element(s) based on other materials or implementations that may emerge in a future time frame as improved, more efficient TEG materials develop. It is understood that although FIG. 3 illustrates only a single TEG element, multiple thermoelectric generators (TEG) 302 elements may be electrically connected in series or/and parallel to achieve desired voltage, current, source impedance, and/or other characteristics. Furthermore, intermediate stages such as switching element(s) can be inserted between the TEGs and controlled by a controller. Note that a heat source can be thermally connected (coupled) to the cold side of a TEG and a cooler can be thermally connected (coupled) to the hot side of a TEG. In that case, a voltage with reversed polarity will be produced but those in the skilled art should be able to utilize the voltage appropriately.

In a preferred embodiment, cooler 304 is an element that releases heat from the cold side of the TEG so that the temperature on the cold side of the TEG is kept within a prescribed range. There are numerous ways known in the art to implement a cooler, for examples, heat sink (electrically passive or/and active with convection or/and thermoelectric cooler (TEC)), radiator (heat exchanger), liquid coolant (including water produced as a byproduct of a fuel cell), phase changing material, heat pipe, vapor chamber, human body, or/and atmosphere of a planet or a moon. The main purpose of utilizing heat source to TEG interface element 301 and TEG to cooler interface element 303 is two fold: 1) to facilitate the efficient transfer of heat and 2) to establish mechanical support and interface for the elements they are interfacing to/from. The heat source to TEG interface element 301 and the TEG to cooler interface element 303 may be made of metals, ceramics, or/and graphite and are thermally connected to the elements they are interfacing to/from. Thermal grease-based materials and/or phase changing films can be applied to these elements if deemed desirable. The heat source to TEG interface element 301 and the TEG to cooler interface element 303 may be omitted if deemed unnecessary. Note that it is possible to combine the functions of the TEG to cooler interface element 303 and the cooler 304, for example by utilizing flexible graphite material to efficiently conduct and dissipate heat.

Referring still to FIG. 3, the power generating circuit 317 further includes a capacitor 305 coupled to the TEG 302. As the heat source 300 produces increased heat, the temperature difference between the cold side of the TEG and the heated side of the TEG increases, causing the TEG to produce electrical potential, which then charges the capacitor 305. It should be noted that in the context of this document, charge storage and energy storage are used interchangeably. If necessary, a plurality of capacitors 305 can be electrically connected in series or/and in parallel to achieve the desired electrical and/or mechanical characteristics. Voltage balancing circuit(s) (either passive or active) can be used to ensure the voltage applied to each capacitor is maintained within a desired range. Furthermore, although not shown in FIG. 3, current/voltage limiter(s) may be inserted between the thermoelectric generators (TEG) 302 and the capacitor 305, if necessary, in order to control the amount of charge or energy being transferred to and stored on the capacitor 305.

Referring still to FIG. 3, the power generating circuit 317 further includes a converter 315 coupled between load 312 and capacitor 305. Preferably, converter 315 is coupled to load 312 via current control element 311 and coupled to capacitor 305 via current control element 314. Current control elements 314 and 311 control the amount of current drawn from capacitor 305 into converter 315 and then provided from converter 315 to load 312. Converter 315 is an element that takes an input parameter, such as voltage and produces a prescribed parameter(s) such as voltage at the output. In the case where the desired conversion is from a low input voltage to a higher output voltage, a step up (boost) voltage converter can be used. In the case where the desired conversion is from a high input voltage to a lower output voltage, a step down (buck) voltage converter can be used. Alternatively, an inverter can be used if DC to AC conversion is desired. Various implementations of converters (or regulators) are known in the art and the invention is not intended to be limited to any one particular implementation.

Referring still to FIG. 3 the power generating circuit 317 also includes a monitor/controller 307 coupled to capacitor 305 for monitoring properties of the capacitor 305 such as the voltage, current, or/and temperature of capacitor 305. The monitor/controller 307 may also be used to monitor parameters, such as voltage or/and temperature of the main energy/power source 309 and/or the amount of current or power provided to the load from the main energy/power source 309. In cases where the main energy/power source 309 is a fuel cell, the monitor/controller 307 may also be connected directly to the fuel cell in order to control the amount or rate of fuel supplied to the fuel cell.

As is shown in FIG. 3, the monitor/controller 307 is coupled to current control elements 310, 316 and current control elements 314, 311. The current control elements 310, 311, 314, and 316 are essentially switching elements which control the flow of current/power to the load based on control signal(s) received from the monitor/controller 307. The current control elements 310 311, 314, and 316 can be implemented with various types of electrical devices such as a field-effect transistor (FET), a bipolar transistor (BJT), an insulated gate bipolar transistor (IGBT), a silicon controlled rectifier (SCR) or/and electromechanical devices. In operation, controller 307 is configured to monitor and control operations of these current control elements in order to achieve the objectives of the invention. Higher number of current control elements can be utilized if desired.

Referring to FIG. 3, as the voltage across the capacitor 305 reaches a predetermined voltage "high" level (or a predetermined charge high level), the monitor/controller 307 enables the current control elements 311, 314 (in an appropriate order) and a current starts to flow into the electrical load 312 (also assuming the predetermined voltage level is higher or equal to the minimum operating voltage of the converter 315) and the current drawn from regulator 308 is now reduced by the amount of current equal or substantially equal to the current from the converter 315 output since the regulator 308 and the converter 315 outputs are connected in parallel and their output voltages are kept within a prescribed range. Therefore, the current drawn from the energy/power source 309 is reduced approximately (assuming high efficiency and/or low implementation loss) by the amount of current provided from the converter 315 times the conversion factor, Vout/Vin of the regulator 308. The power saving process continues until the charge (or voltage) in the capacitor 305 drops below a predetermined low threshold level. It should be noted that the energy stored in the capacitor 305 can be used to "boost" the operation of the electrical load 312 by providing more available power to the load. Either one, or both, of the current control elements 311 and 314 can be set to shut off current when the charging process initially starts or during a recharging process.

In order to achieve effective power reduction on the main energy/power source 309, the proper current sharing between the converter 315 and regulator 308 is required and their output voltages must be properly set and controlled. A small difference in voltages may make one of them completely "take over" the current supplying process. For example, if the output voltage of the regulator 308 is 5% higher than the output voltage of the converter 315, the regulator 308 is likely to supply the majority of the current to the electrical load 312 even though the capacitor 305 may have been accumulated a large amount of energy over time.

There are many ways known in the art to implement good current sharing. One implementation utilizes a series resistive element (such as a resistor or a FET) as a sensor element in each converter output current path to sense current, a high gain amplifier such as an operational amplifier, and an integrator to produce an error control signal, which is input to the control port of the converter 315 and controls the voltage of the converter 315 so that the output should follow the regulator 308 output within a specified range. The error is used to adjust the output of the converter 315 until the current in each path (or the voltage across the sense resistive element) is within a predetermined range. Therefore, by using this technique, the voltage from the regulator 315 output can be adjusted to follow the voltage from the regulator 308 output within a desired range once each path starts to conduct current. The current control elements 310 and 311 themselves can be used as the series resistive sensor elements to sense (detect) currents/voltages.

Those in the skilled art can select a desired ratio of current sharing between the converter 315 and the regulator 308 to suit to the ones' particular applications. For instance, the output voltage of the converter 315 may be deliberately set at slightly higher voltage than the output voltage of the regulator 308 so that the converter 315 can supply majority of the current into the electrical load 312 once sufficient energy has been stored in the capacitor 305. With that being the case, high reduction in power on the main energy/power source 309 is achievable until the charge stored in the capacitor 305 drops below a predetermined low threshold level. Under a heavy electrical loading condition, however, the current on the electrical load 312 may require a current which exceeds the maximum current supply capability of the converter 315 and/or that of the capacitor 305. With this being the case, the output voltage of the converter 315 may drop and become lower than the output voltage of the regulator 308 (due to the limiting action of the converter 315) and the current control/switching element 311 (such as a diode) cuts off the electrical path to the electrical load 312, forcing the regulator 308 to supply again the entire current to the electrical load 312. More specifically, as more charge is stored on capacitor 305, more power and current can be provided from the capacitor 305 to load 312 via converter 315 and current control elements 311 and 314. Monitor/controller 307 measures this power/current as it increases and is then able to control the current/power provided by main energy/power source 309 to the load 312 via current control elements 310 and 316. Accordingly, as the power/current provided from capacitor 305 increases, the amount of power/current which must be drawn from the main energy/power source 309 and provided to load 312 decreases, using less of the energy from the main energy/power source 309 over time and extending the life of the main energy/power source. Additionally, the energy stored in the capacitor 305 may be used to supply current or power to the load 312 as a backup or uninterrupted power source when the main energy/power source 309 fails to operate properly or is temporarily removed/disconnected from the system (e.g., replacing the battery of a laptop computer without disrupting the operation of the system).

If the main energy/power source 309 is a disposable battery or a hybrid cell, a battery life extension results by reducing the power drawn from the main energy/power source 309 attributed to the power saving process as described herein. Suppose that the main energy/power source 309 is a battery with 1000 mAh capacity and the load 312 draws average current of 500 mA at 5V. If the converter 315 can supply 56 mA of average current (at 5V) to the load 312, then 5V times 0.0056 A=0.28 W of power out of 2.5 W (=5V times 0.5 A) is supplied by the converter 315 until the voltage (or charge) drops below a predetermined low threshold. Assuming 90% efficiency of the regulator 308, that corresponds to 0.28 W/0.9=0.31 W of power delivered by the main energy/power source 309. Without the current (or power) from the converter 315, the battery life is 1000 mAh/500 mA=2 hours. However, if it takes, for example 35 minutes to first charge the capacitor 305 to a predetermined high level and 5 minutes to deplete the charge to a predetermined low level and then 15 minutes to recharge to the predetermined high level thereafter, the average current drawn from the battery becomes approximately 488.3 mA and the battery life becomes 1000 mAh/488.3 mA=2.05 hours. To reduce the long initial charging time on an uncharged capacitor, the main energy/power source 309 (with the appropriate current control elements and monitoring schemes) may be used to rapidly charge the capacitor 305. Charging from the main energy/power source 309 may be useful for maintaining a certain amount of charge (energy) in the capacitor 305 when heat is not available (such as during power down).

In a preferred embodiment, monitor/controller 307 can be purely implemented in hardware (for example, by using a comparator with hysteresis, a reference voltage generator, and a switch element driver) or in a combination of hardware and software (for example, using a CPU, an ADC, switch element driver(s), and memory with embedded software). Indeed, the monitor 307 can include and utilize analog to digital converters (ADCs), digital to analog converters (DACs), negative voltage generator(s), or/and level shift circuitries with switch element drivers and they can be all integrated into a single integrated circuit (IC). A clock signal for the monitor/controller 307 can be generated by a low power oscillator whose power is supplied by either the main energy/power source 309 or the capacitor 305. The monitor/controller 307 can be powered up by the main energy/power source 309, the capacitor 305, or an external source.

If the monitor/controller 307 is implemented in software, portions of the control software may comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 4:
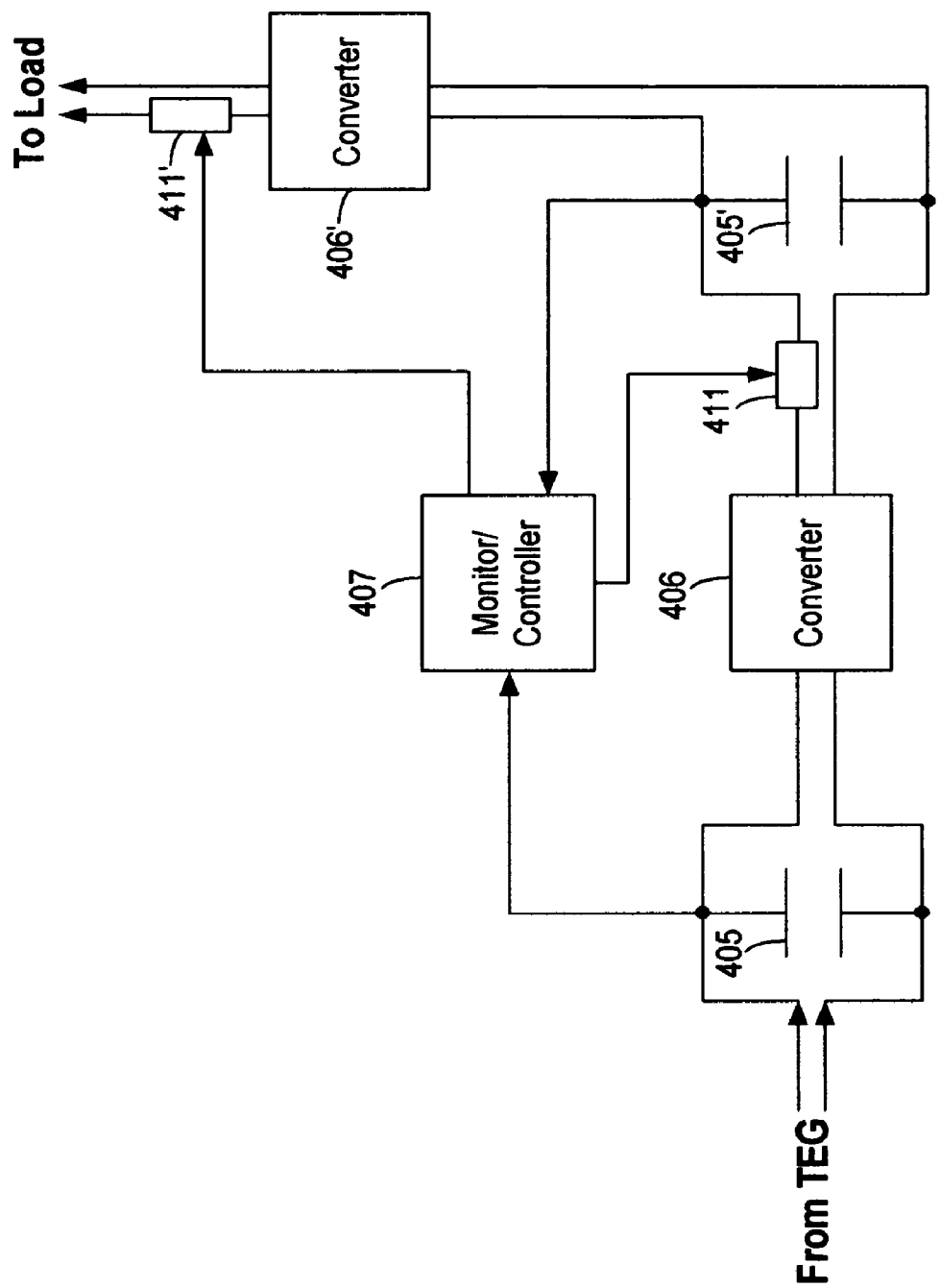
FIG. 4 illustrates an alternate embodiment of the power saving circuit illustrated in FIG. 3 in which there are double charging stages.

FIG. 4 shows an alternate embodiment of a power saving circuit for the present invention in which there are double charging stages. This particular configuration has two capacitors 405 and 405', two converters 406 and 406', a monitor/controller 407 and two switching elements 411 and 411'. As with the embodiment illustrated in FIG. 3, switching elements 411 and 411' are controlled by the monitor/controller 407 so that they are set to conduct currents as well as to shut off currents at appropriate times. The monitor/controller 407 monitors various parameters of the capacitors 405 and 405', such as voltage, current, temperature, etc. In the embodiment illustrated in FIG. 4, the capacitor 405' can be a main charge reservoir and the switching elements 411 and 411' can isolate the charge reservoir from the rest of the system/circuit when the load is turned off (or the main system is powered down) so as to prevent depletion of the charge stored on capacitor 405' due to leakage during power shut off. The capacitances of the capacitors 405, 405' as well as other factors must be carefully considered and analyzed to not incur instability of the converters 406, 406'. Also, there exist ways to charge capacitors and produce a voltage higher than the voltage from which they operate. One example is the use of a charge-pump (or sometimes called as voltage multiplier) utilizing a plurality of capacitors, switching elements, and clock signal(s). These charging or voltage generating techniques can be used if deemed desirable. A clock signal for the charge-pump can be generated by a low power oscillator whose power is supplied by either the main energy/power source 309 or the capacitor 305.

Referring still to FIG. 4, in a first state, switch 411 is initially open, allowing charge to build up quickly on capacitor 405. When that charge reaches a certain high or fully charged level, switch 411 is closed and the charge is transferred to capacitor 405'. Once the charge has been fully switched over to capacitor 405', switch 411 may open. In this state, charge builds up on capacitor 405, while the charge which was transferred to capacitor 405' may then be supplied to the load. Again, once the charge on storage element 405 reaches a certain high or fully charged level and once charge at capacitor 405' has been fully exhausted or drops below a certain threshold level, the charge from capacitor 405 is then switched to capacitor 405' and the process repeats itself. In this way, the system can build-up charge/energy while at the same time providing charge/energy, thereby making the system more efficient. As in the previous embodiment, a main energy source can be used to charge capacitor 405 or/and capacitor 405' if desired.

Figure 5:
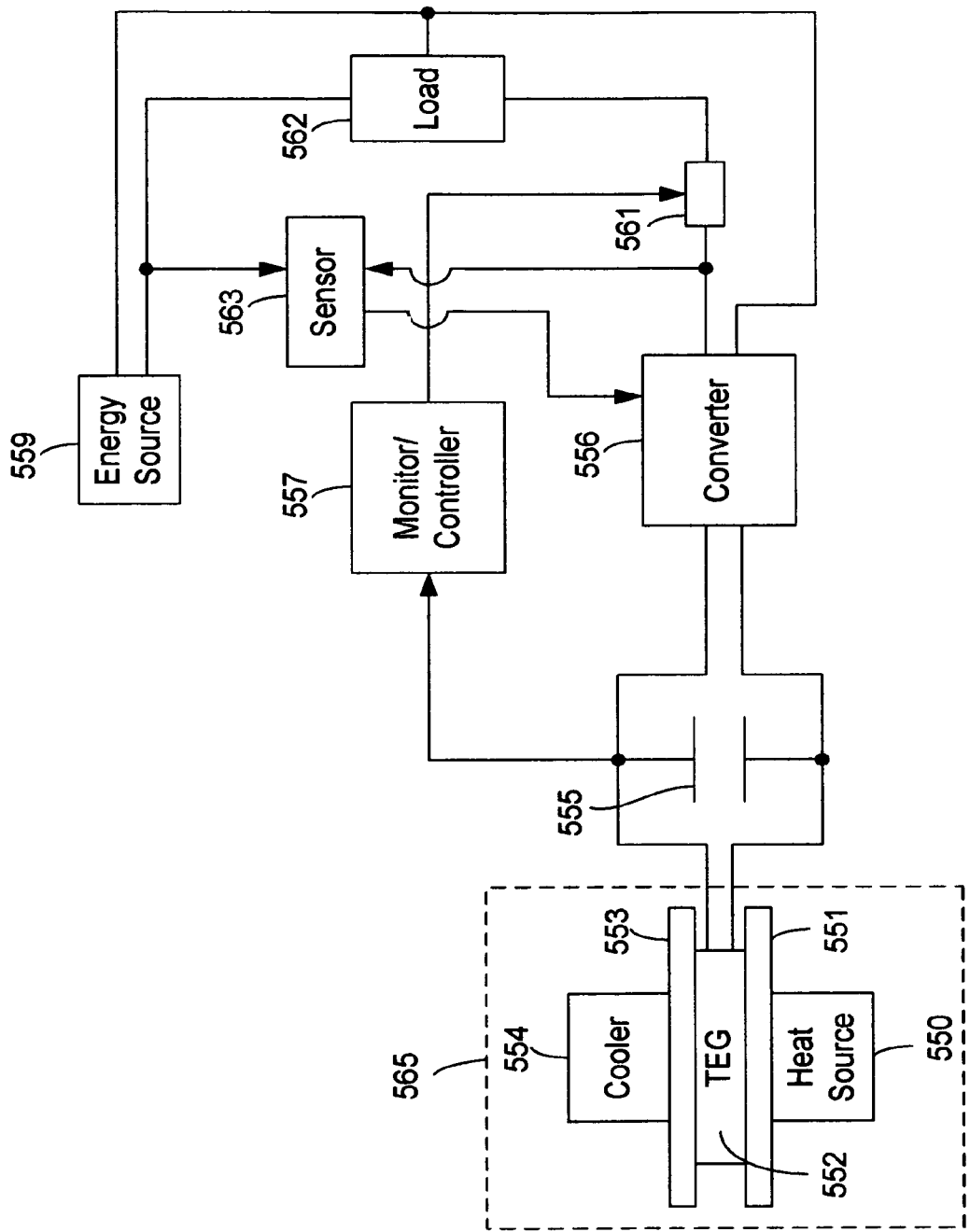
FIG. 5 illustrates an alternative embodiment of an entire drive system which includes an alternative power saving circuit for providing power to an electronic system or device which extends the life of a main energy/power source, in accordance with the present invention.

FIG. 5 shows an alternate embodiment of a system of the present invention having a slightly simpler structure. As in the previous embodiment described with reference to FIG. 3, it has power generation means 565, capacitor 555, converter 556, monitor/controller 557, main power/energy source 559, current control element 561, and electrical load 562. Unlike the embodiment shown with reference to FIG. 3, the alternative embodiment shown in FIG. 5 further includes a sensor 563, which senses the difference between the voltages from the main power/energy source 559 and the converter 556 output and produces an error control signal that is used to adjust the output voltage of the converter 556 so that the output voltage can follow the voltage from the main energy source 559 within an acceptable range. As mentioned previously, one can utilize implementations known in the art in order to achieve this feedback/control. One such example is placing a series resistive element (such as a resistor or a FET) as a sensor or sensing element in each output current path to sense current, a high gain amplifier such as an OP amp and an integrator to integrate the difference voltage and produce an error signal to controls the feedback voltage of the converter 556. The feedback voltage is varied by the error control signal until the current in each path (or the voltage across the sense resistive element) is within a predetermined range.

Preferably, the sensor 563 is designed so that it controls the output of converter 556 to supply the proper voltage at the electrical load 562. This is important especially if the current control element 561 introduces a non-constant voltage drop. Therefore, instead of monitoring the voltage at the converter 556 output, monitoring the voltage at the output of the current control element 561 (or at the electrical load 562) is perhaps a better way. If this is done, then a resistive sensing element is preferably inserted between the current control element 561 and the electrical load 562. Alternatively, the current control element 561 can be used as a sensing resistive element for the sensor 563.

It should be noted that the sensor 563 is needed assuming an unregulated, varying voltage from the main energy/power source 559. The sensor 563 can be driven and/or powered by the main energy/power source 559, the capacitor 555, the converter 556, or from any other external source. The functionality of the sensor 563 can be integrated into the monitor/ controller 557 as in the form of a module consisting of discrete components or/and various integrated circuits. It is also possible that the sensor 563 can be interfaced with and controlled by the monitor/controller 557.

As in the previous embodiment described with reference to FIG. 3, the monitor/controller 557 in FIG. 5 monitors various parameters in the system such as the voltage, current, or/and temperature of an element and for this embodiment, the monitor 557 monitors the voltage at the capacitor 555 and controls the current control element 561 with current control signal(s). It is also possible to configure the monitor/controller 557 such that it controls the operation, properties, or/and the state of the converter 556, the heat source 550, or any other element shown in FIG. 5. Furthermore, it is also possible to implement the monitor/controller 557 to monitor and control a plural of the element(s) shown in FIG. 5 (not necessarily simultaneously) and also interface with the sensor 563 and/or external element(s). The monitor/controller 557 can be purely implemented in hardware (for example, by using a comparator with hysteresis, a reference voltage generator, and a switch element driver) or in a combination of hardware and software (for example, using a CPU, an ADC, switch element driver, and memory with embedded software). Indeed, the monitor/controller 557 can include and utilize analog to digital converters (ADCs), digital to analog converters (DACs), negative voltage generator(s), or/and level shift circuitries with switch element drivers, clock generator(s), and they can be all integrated into a single integrated circuit (IC).

The power generating means 565 preferably consists of heat source 550, a thermoelectric generator (TEG) 552, a cooler 554, a heat source to TEG interface element 551, and TEG to cooler interface element 553. Again, the heat source 550 can be the main power source 559, the electrical load 562, or/and any other elements internal or external to the system and circuit that produce or possess heat.

As the main power/energy source 559 is electrically connected to the electrical load 562, heat is generated, for instance from the main power source 559 and/or the electrical load 562 and either one or both of them can be used as the heat source 550. As heat is produced and the cooler 554 removes the heat from the cold side of the TEG 552 or/and TEG to cooler interface element 553, a temperature difference is produced between the cold and the hot sides of the TEG 552 and in turn it produces a potential difference (i.e., voltage) that charges the capacitor 555. Charge (or energy) is built up in the capacitor 555 in order to provide current and/or power to the electrical load 562, which up until such time remains driven by the main power/energy source 559 without power saving.

Once a predetermined amount of charge is built up on the capacitor 555, the converter 556 starts to produce an output voltage which is approximately equal to the output voltage of the main power/energy source 559 and if the monitor/controller 557 determines that the charge stored in the capacitor 555 has reached a predetermined high value, it enables the current control element 561 and the current flows to the electrical load 562, thereby reducing the current (and hence the corresponding power) drawn from the main power/energy source 559.

As the current flows from the converter 556 to the electrical load 562, the sensor 563 improves the accuracy of tracking and the proper current sharing is maintained. For even a simpler embodiment, the monitor/controller 557 can be omitted and a diode can be used as the current control element 561. The sensor 563 must take into account the voltage drop associated with the diode for that case.

As in the previous embodiment, there could be intermediate stages between the power generation means 565 and the capacitor 555 for efficient charging of the capacitor. By way of example, such intermediate stages may include any one or combination of circuits such as charge-pump or voltage multipliers. Also, charging of multiple storage elements with multiple heat sources or power generating means is possible.

In cases where the electrical load 562 is an inverter (DC to AC converter), which subsequently can drives AC loads such as an AC motor, a home appliance, and etc. it is possible to achieve highly efficient power utilization. For example, for an electric car whose main energy supply is the main power/energy source 559 (such as fuel cell), heat generated from main power/energy source 559 or/and regenerated energy during braking can charge capacitor 555. The energy collected then can be used to assist the main power/energy source 559 in delivering power to the electrical load 562 and its subsequent loads such as AC motor(s). Again, it is possible to boost the power of the electrical loads if desired. As another example, an AC generator to supply power to AC equipment (television, heater, lamps, etc.) in outdoor environments or places where AC outlet is not available can be powered up by the main/power energy source 559 (fuel cell etc.). The heat generated by the energy source 559 or any other heat source can be transformed to electrical energy which is then collected and stored in the capacitor 555. The stored energy can be used to assist the energy source 559 in delivering power to the electrical load 562 and its subsequent loads such as lamps.

Figure 6:
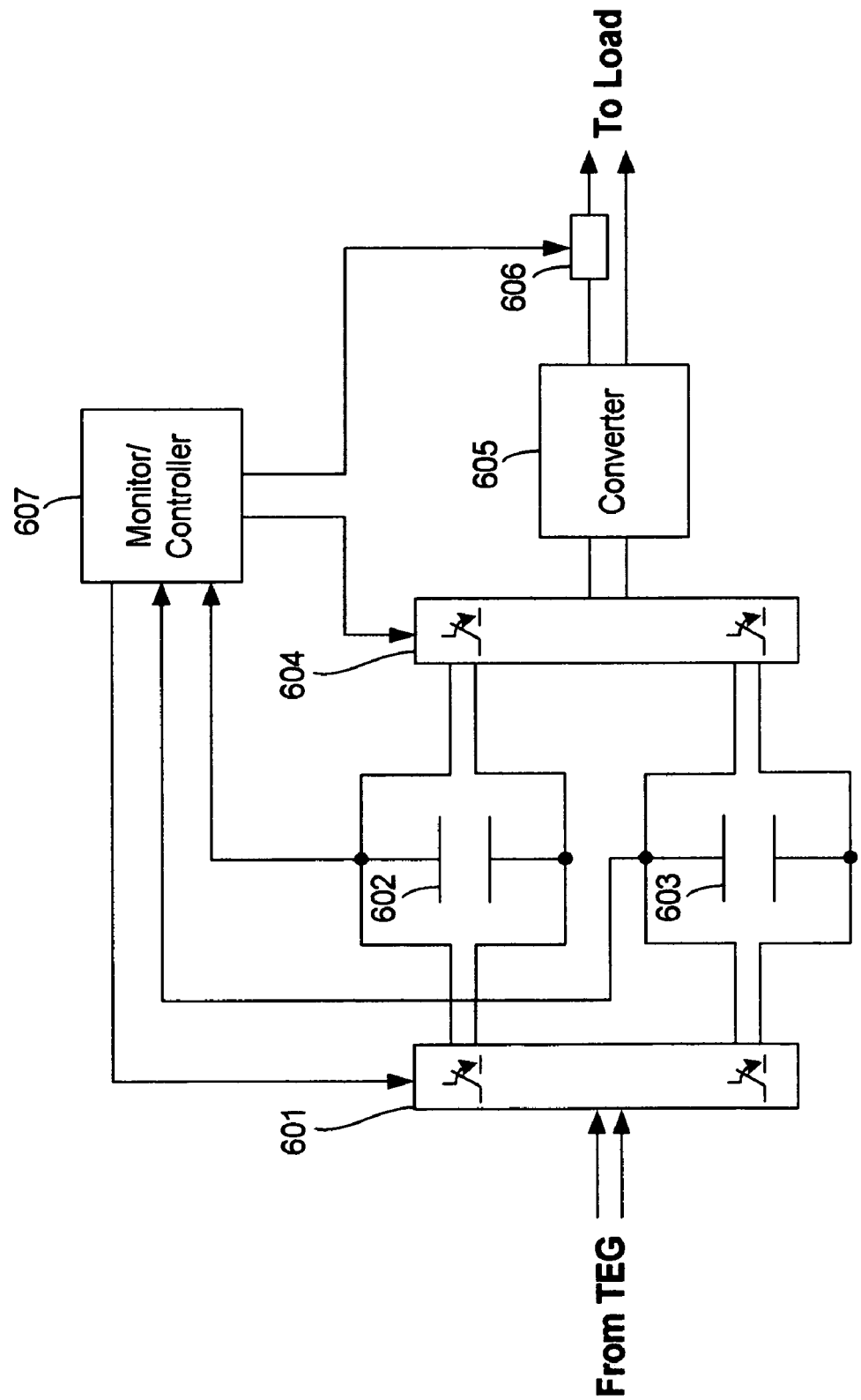
FIG. 6 illustrates an alternate embodiment of the power saving circuit illustrated in FIG. 3 in which there are parallel charging stages.

Finally, FIG. 6 shows an alternate embodiment of a power saving circuit for the present invention in which there are parallel charging stages which are used in an alternating fashion in order to increase the life and efficiency of a main power/energy source. This particular configuration has two capacitors 602 and 603, a single converter 605, a monitor/controller 607, a switching element 606 and two main switching elements 601, 604 (each having at least two individual switches that can be independently controlled by the monitor/controller 607). As with the embodiments illustrated in FIGS. 3 and 4, switching elements 601, 604, 606 are controlled by the monitor/controller 607 so that they are set to conduct currents as well as to shut off currents at appropriate times. The monitor/controller 607 monitors various parameters of the capacitors 602 and 603, such as voltage, current, temperature, etc. It is understood that the capacitors 602 and 603 can each consist of a plurality of capacitors electrically connected in series and/or parallel.

Referring still to FIG. 6, in a first or initial state switching element 601 is configured such that one switch is configured to allow charge to build up quickly on capacitor 602 while the other switch remains open. In this initial state, the first switch in switching element 604 is open, while the second switch may be closed. When the charge on capacitor 602 reaches a certain high or fully charged level, the first switch in switching element 601 is then opened and the second switch in switching element 601 is then closed. Additionally, the first switch in switching element 604 is then closed, while the second switch in switching element 604 is then open. In this state, charge builds up on capacitor 603, while the charge which was built up on capacitor 602 may then be supplied to the load. Again, once the charge on capacitor 603 reaches a certain high or fully charged level and once charge at capacitor 602 has been fully exhausted or drops below a certain low level, the individual switches in switching elements 601 and 604 are then alternated, closing the first switch and opening the second switch in switching element 601, while opening the first switch and closing the second switch in switching element 604. In this state, the charge build up on capacitor 603 is then applied to the load while capacitor 602 is recharged (assuming switching element 606 is set to conduct current). In this way, the system can build-up charge/energy while at the same time providing charge/energy, thereby making the system more efficient. It is understood that switching element 601 can be connected to multiple TEGs each having own heat source and cooler and the monitor/controller 607 selects/enables appropriate electrical path(s) to charge capacitor(s). In a system, heat generated by its constituents may differ and may also be time dependent. The monitor/controller 607 can monitor the state of the capacitors and the temperature of the constituents and charge/discharge the capacitors in an optimal way.

While the description above contains many specifics, these should not be construed as limitations on the scope of the invention, but rather as exemplifications of particular embodiments thereof. One of ordinary skill in the art may make many changes, modifications, and substitutions without necessarily departing from the spirit and scope of the invention. Accordingly, the scope of the invention should be determined not by the embodiments described above, but by the appended claims and their legal equivalents.

What is claimed is:

1. A circuit for providing power to a load, said circuit comprising:
    a main power/energy source coupled to the load and used to provide power to the load;
    a power generating circuit coupled to the load, and in parallel with the main power/energy source, for providing power to the load,
    a pair of capacitors arranged in parallel and coupled between said power generating circuit and said load;
    a first switching element coupled between the power generating circuit and the pair of capacitors;
    a second switching element coupled between the pair of capacitors and the load; and
    a controller for activating the first and second switching elements, wherein the first and second switching elements are alternately activated such that the first switching element allows charge to be stored from the power generating circuit onto one of the capacitors, while the second switching element allows charge previously stored on the other capacitor to be delivered to the load, thereby reducing the amount of power drawn from the main power/energy source.

2. The circuit of claim 1, wherein said power generating circuit includes a heat source and a cooler thermally coupled to a thermoelectric generator (TEG) for converting thermal energy from said heat source into electrical energy.

3. The circuit of claim 2, further comprising:
    a converter coupled between the second switching element and the load; and
    a sensor coupled to the output of the main power/energy source, the second switching element, and the converter, said sensor used to monitor the output of the main power/energy source and the output at the second switching element and to adjust the output of the converter so that its output follows that of the main power/energy source.

4. The circuit of claim 2, wherein the heat source is the main power/energy source.

5. The circuit of claim 2, wherein the heat source is the load.

6. The circuit of claim 1, further comprising:
    a first converter coupled between the main power/energy source and the load for generating a regulated output to the load;
    a second converter coupled between the pair of capacitors and the second switching element for generating a regulated output to the load;
    a sensor coupled to the output of the first converter and the output of the second converter, said sensor used to monitor the outputs of the first and second converters and to adjust the output of the second converter so that its output follows that of the first converter.

7. A circuit which extends the operational life of a main energy source coupled to a load, said circuit comprising:
    a power generator having a heat source and a cooler thermally coupled to a thermoelectric generator (TEG) for converting thermal energy into electrical energy; and
    a first capacitor coupled between the TEG and the load, for receiving and storing the electrical energy from the TEG;
    a second capacitor coupled in parallel with the first capacitor, between the TEG and the load;
    a first switching element coupled between the TEG and the first and second capacitors;
    a second switching element coupled between the first and second capacitors and the load;
    a first converter coupled to the second switching element and having its output coupled to the load; and
    a controller for activating the first and second switching elements, wherein the first and second switching elements are alternately activated such that the first switching element allows charge to be stored from the TEG on one of the capacitors, while the second switching element allows charge previously stored on the other capacitor to be delivered to the load, thereby reducing the amount of power drawn from the main energy source.

8. The circuit of claim 7, further comprising:
    a second converter coupled between the main energy source and the load for generating a regulated output to the load; and
    a sensor coupled to the output of the first converter and the output of the second converter, said sensor used to monitor the outputs of the first and second converters and to adjust the output of the first converter so that its output follows that of the second converter coupled between the main energy source and the load.

9. The circuit of claim 7, wherein the heat source is the main power supply.

10. The circuit of claim 7, wherein the heat source is the load.

11. A method for providing power to a load comprising:
    coupling a primary energy source to said load for providing power to said load;
    coupling a power generating circuit to said load, and in parallel with the primary energy source, said power generating circuit having a heat source, a cooler, and a thermoelectric generator (TEG) connected to said heat source and said cooler for converting thermal energy into electrical energy;
    coupling a first capacitor between the power generating circuit and the load;
    coupling a second capacitor in parallel with the first capacitor, between the power generating circuit and the load;
    coupling a first switching element between the TEG and the first and second capacitors;
    coupling a second switching element between the first and second capacitors and the load; and
    alternately activating the first and second switching elements such that the first switching element allows charge to be stored from the TEG on one of the capacitors, while the second switching element allows charge previously stored on the other capacitor to be delivered to the load, thereby reducing the amount of power drawn from the primary energy source.

12. The method of claim 11, further comprising:
coupling a first converter between the capacitors and the second switching element for regulating the output from the capacitors;
coupling a second converter between the primary energy source and the load for generating a regulated output to the load; and
coupling a sensor to the output of the first converter and the output of the second converter, said sensor used to monitor the outputs of the first and second converters and to adjust the output of the first converter so that its output follows that of the second converter.

13. The method of claim 11, further comprising:
coupling a first converter between the second switching element and the load;
coupling a sensor to the output of the primary energy source, the output of the second switching element, and the first converter;
monitoring the output of the primary energy source and the output of the second switching element; and
adjusting the output of the converter so that its output follows that of the main energy source.

14. The method of claim 11, wherein the heat source is the primary power source.

15. The method of claim 11, wherein the heat source is the load.

16. A circuit for providing power to a load, comprising
a main energy source coupled to the load;
a power generating circuit coupled to the load in parallel with the main energy source for providing power to the load, said power generating circuit having a heat source and a cooler coupled to a thermoelectric generator (TEG) for converting thermal energy into electrical energy;
first and second capacitors arranged in parallel and coupled to the TEG for storing the electrical energy;
a first switching element coupled between the TEG and the first and second capacitor;
a second switching element coupled between the first and second capacitors and the load, and
a controller for alternately activating the switching elements in order to alternately store charge on one of the capacitors while delivering power to the load from the other capacitor, thereby reducing the amount of power drawn from the main energy source.

17. The circuit of claim 16, further comprising: a first converter coupled between the second switching element and the load for receiving power from either the first or second capacitors and generating a regulated output to the load.

18. The circuit of claim 16, further comprising:
a first converter coupled between the main energy source and the load for generating a regulated output to the load;
a second converter coupled between the first and second capacitors and the at least one switching element for generating a regulated output to the load; and
a sensor coupled to the output of the first converter, the output of the second converter, and the second converter control port said sensor used to monitor the outputs of the first and second converters and to adjust the output of the second converter so that its output follows that of the first converter.

19. The circuit of claim 16, wherein the heat source is the main power source.

20. The circuit of claim 16, wherein the heat source is the load.

* * * * *